Figure 1:
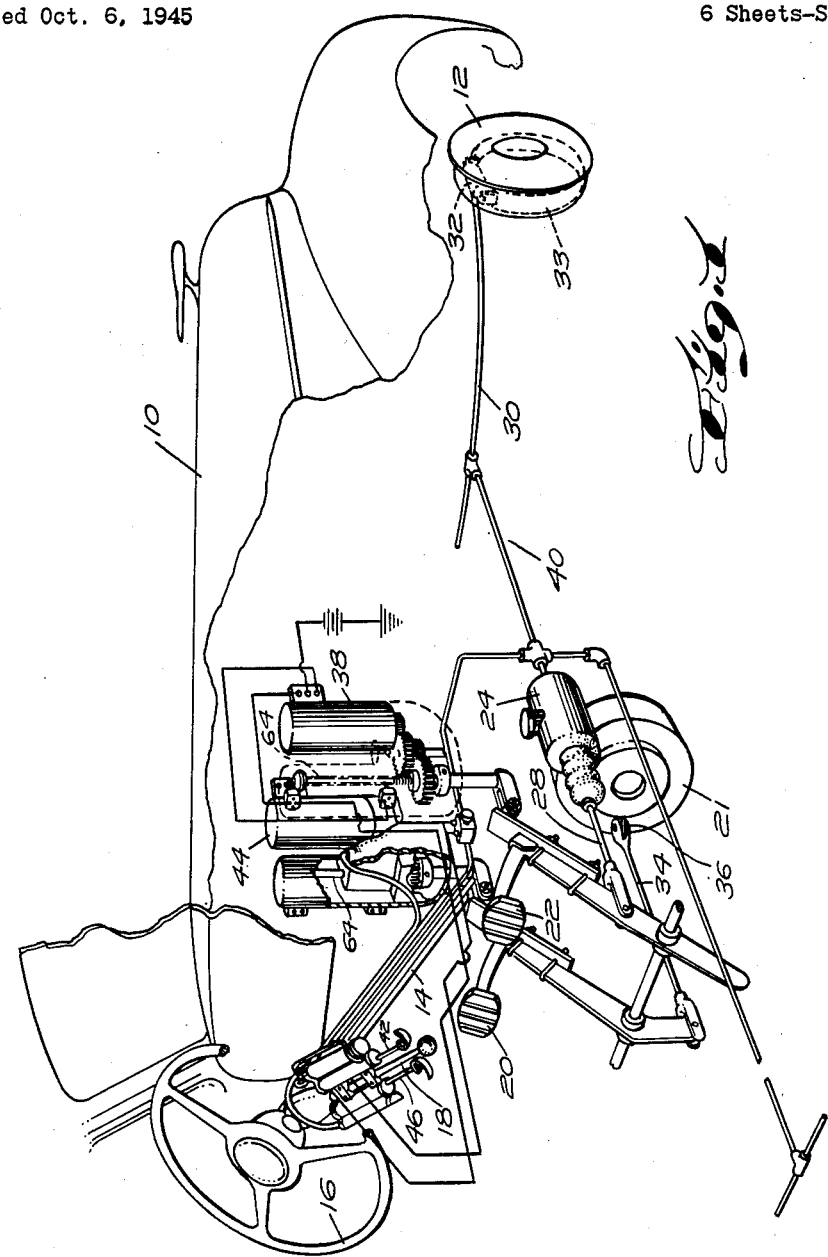

Nov. 7, 1950  J. A. N. DUBREUIL  2,529,076
HAND CONTROL FOR MOTOR VEHICLES
Filed Oct. 6, 1945  6 Sheets-Sheet 1

INVENTOR.
Joseph A. N. Dubreuil
BY Thomas A. Jenckes
Attorney

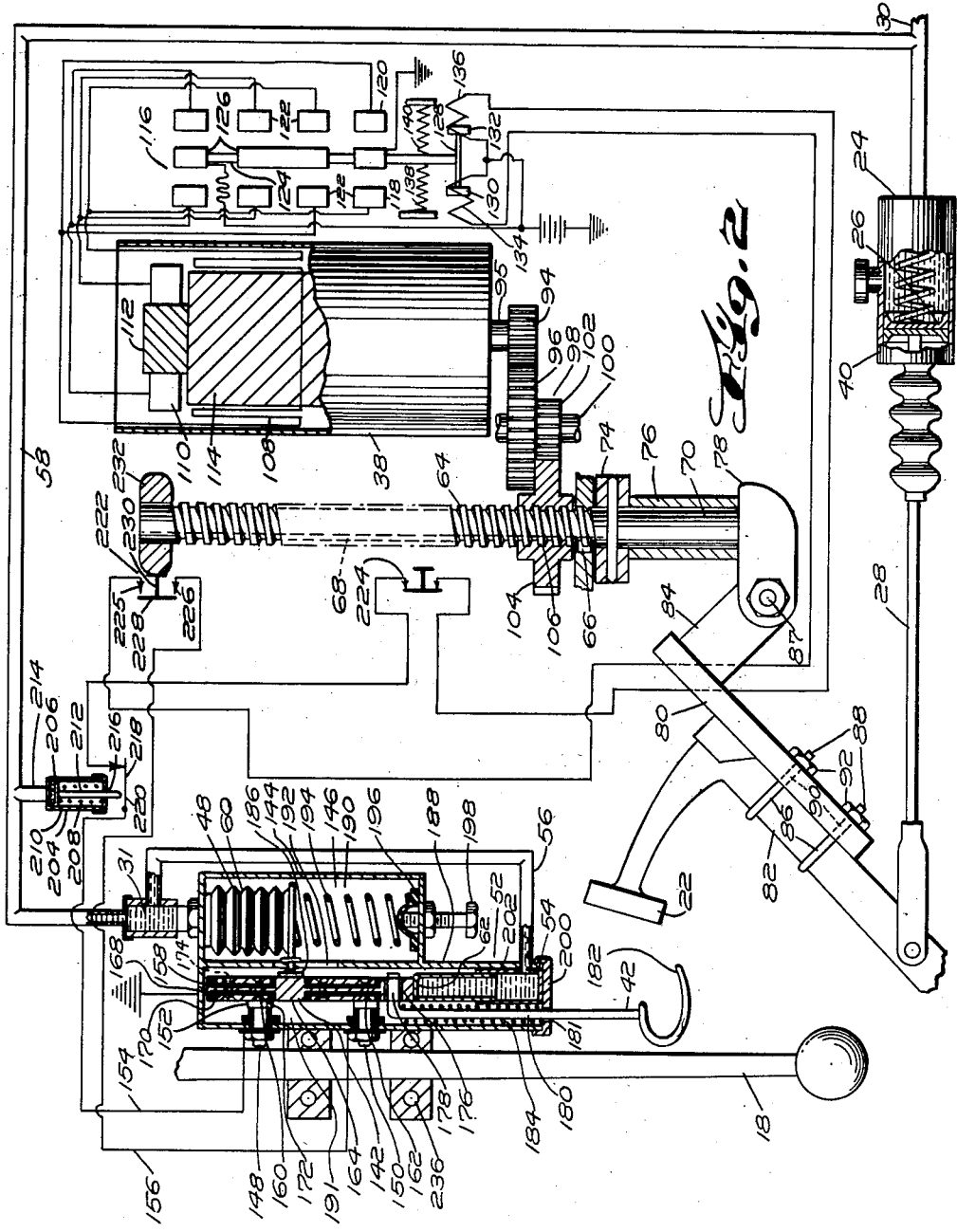

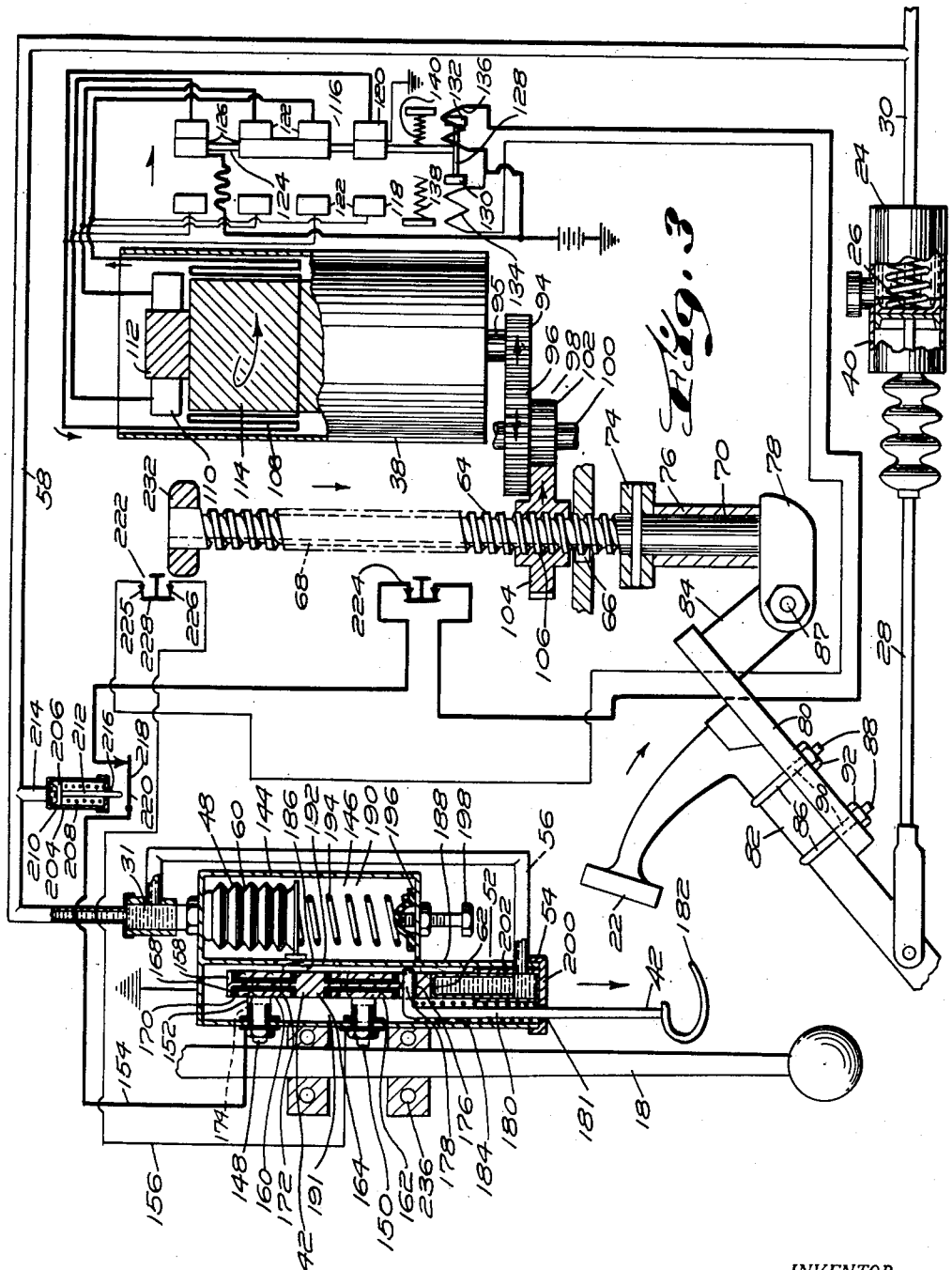

Nov. 7, 1950                J. A. N. DUBREUIL                2,529,076
                        HAND CONTROL FOR MOTOR VEHICLES
Filed Oct. 6, 1945                                      6 Sheets-Sheet 4
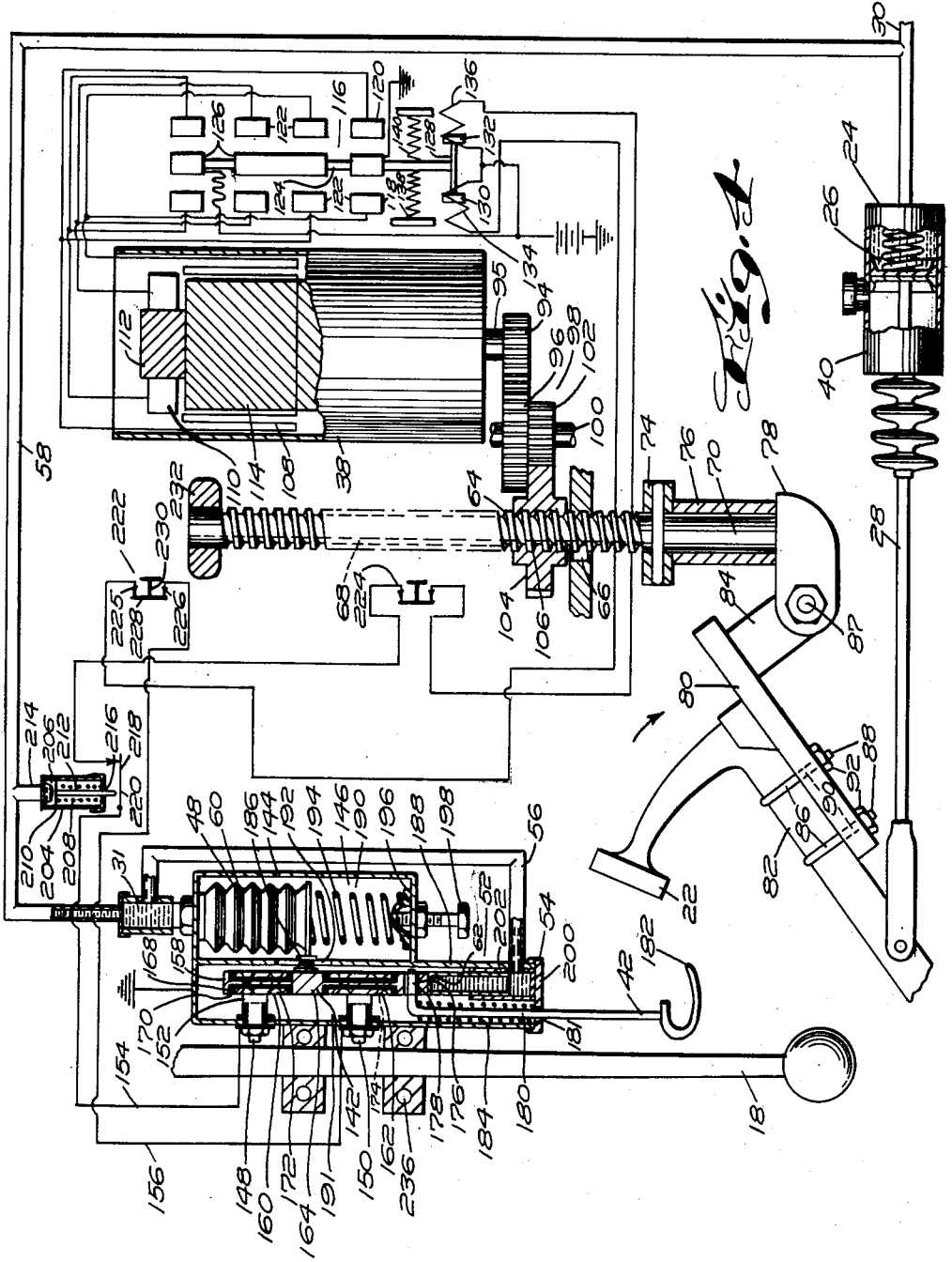
INVENTOR.
Joseph A. N. Dubreuil
BY
Thomas A. Jenks
Attorney

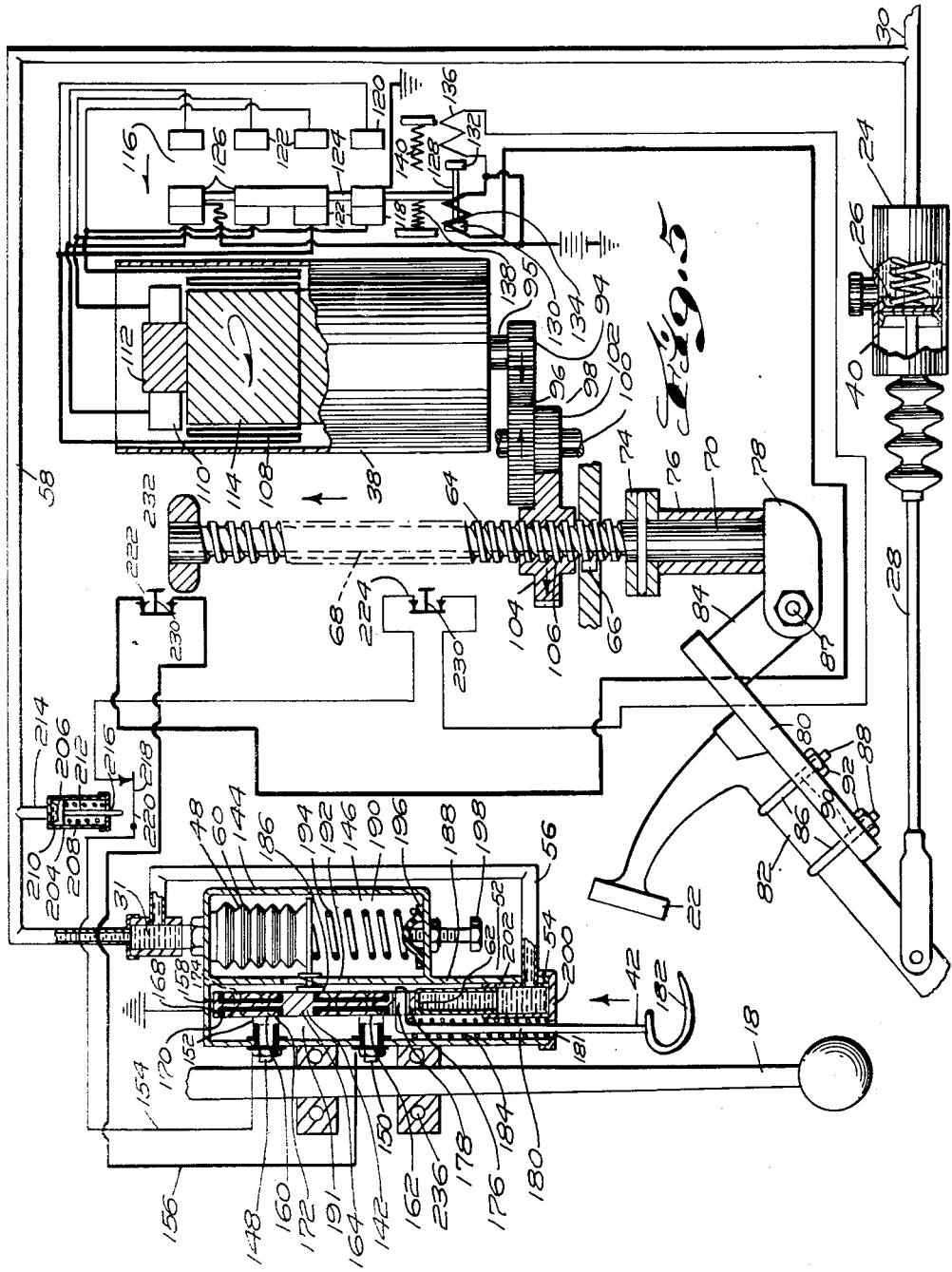

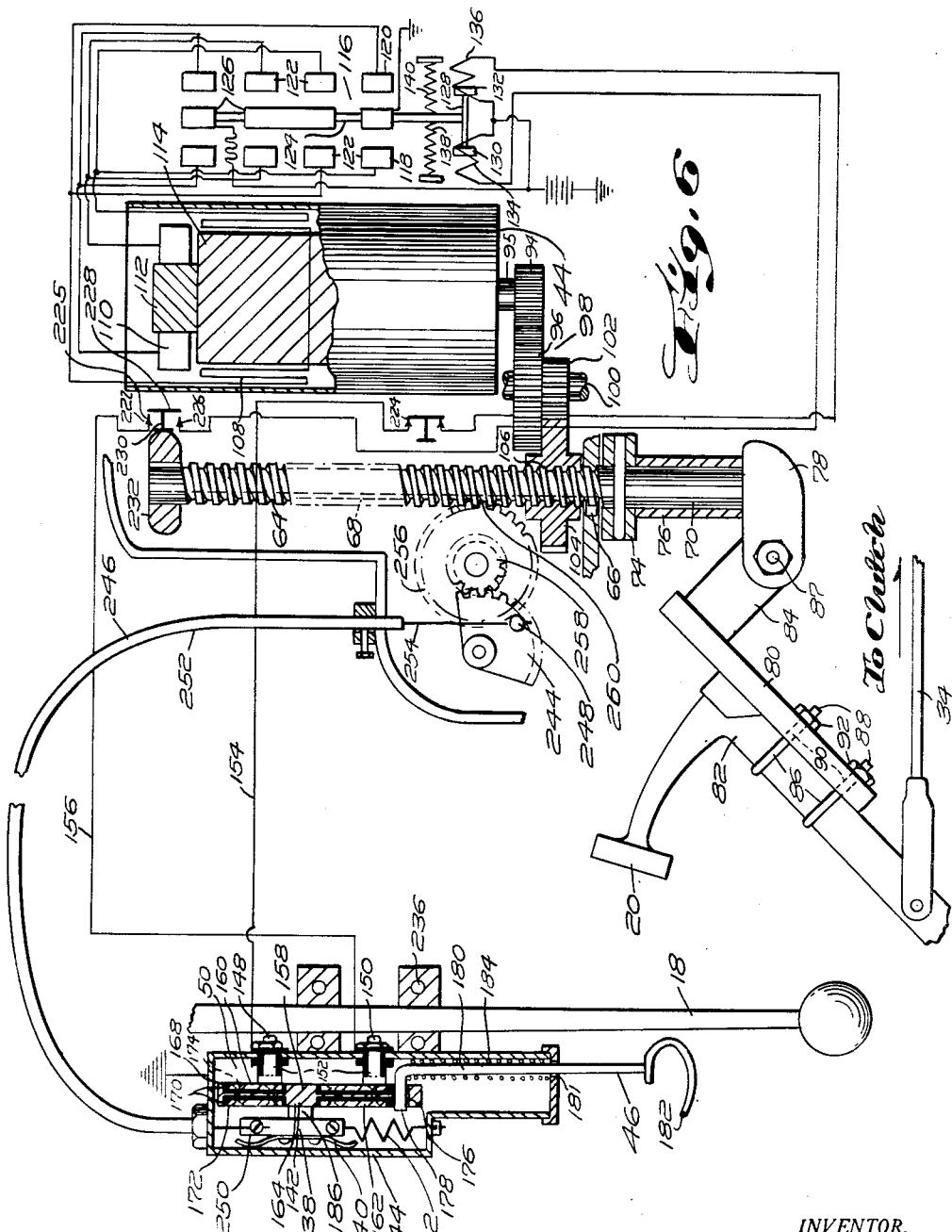

Patented Nov. 7, 1950

2,529,076

UNITED STATES PATENT OFFICE 2,529,076

HAND CONTROL FOR MOTOR VEHICLES

Joseph A. N. Dubreuil, Pawtucket, R. I.

Application October 6, 1945, Serial No. 620,683

17 Claims. (Cl. 192—3.5)

My invention relates to improvements in hand controls for motor vehicles.

A main object of my invention is to provide a control system for motor driven vehicles which can be operated by a leg cripple by means of his hands alone, and to make this possible I have provided a control system having motive or booster means for actuating the clutch or applying power to the brakes, and control means therefor which can be actuated by a finger.

A further object of my invention is to provide a control system which may be sold as an attachment for attachment to standard cars and one which is so constructed that the car can still be driven by a person having control of his feet as usual, if desired. In other words, I provide an attachment, which even when attached does not interfere with the normal or standard operation of the vehicle.

A further feature of my invention resides in the fact that I preferably mount my finger controls on the gear shift lever so that the fingers of the hand which operates said gear shift lever may supplementally actuate the finger control means for the brakes and also the finger control means for the clutch leaving the other hand free for operation of the steering wheel and throttle.

I have discovered that the movement of an operating member by a hand to control the booster or servomotor for operating the braking mechanism is not entirely satisfactory in use for there is no way of telling in what degree the brakes have been applied, which varies on so many different factors, such as grade, wind, etc. A further object of my invention is to provide a control device or switch which may be operated by a finger but which actually feels the braking pressure applied, due to resistance to its movement. As in similar devices actuated by a foot pedal, this attainment of "feel" is accomplished by making the operating member, in former instances the brake pedal, in this instance the finger operated movable member, do some of the work of applying the brakes and I have so reduced the amount of work in applying the brakes accomplished by this finger operated member as to make the operation of said member finger resistant, and I believe that I am the first, therefore, to provide a "feel" in a finger control and the first to construct a practical finger control device having a "feel."

A further object of my invention is to connect the "feel" portion of the finger operated device directly to the brake fluid preferably at a point adjacent the brake fluid cylinder so that the "feel" is more immediately responsive to the braking pressure.

A further object of the specific form of my invention shown is to provide an electric servomotor for doing the work of applying the brakes or moving the clutch in combination with a hydraulically operated follow up device for shutting off the servomotor, also preferably immediately responsive to the pressure in the brake fluid so that the servomotor may be immediately shut off when its end has been attained, permitting gradual application of the brakes or step by step application of the brakes or release thereof, if desired. For this purpose I preferably employ a reversing electro servo or booster motor having a hydraulic follow up device for brakes controlled by the pressure in the brake fluid, and to reverse the motor I preferably employ a novel type of double throw multiple contact solenoid operated reversing relay switch especially designed by me for this purpose.

A further object of my invention is to provide a control system for motor vehicles, whether one to control the brakes or clutch, which is continuously operative whether or not the propelling engine of the vehicle is running as the electric servomotor for applying the control means is operated by the storage battery which serves as a source of power whether the vehicle engine is running or not and the hydraulic follow up drive is controlled by the pressure in the brake fluid which is also independent of the running of the vehicle engine.

Further features of my invention relate to the structure of an improved combination finger operated fluid follow up, preferably operated by the pressure of the brake fluid, and combination switch, which can be readily mounted on the gear shift lever, in which are incorporated suitable contacts for reversing the direction of the reversible motor, and a supplemental movable contact actuated by pressure from the brake fluid to shut off the electric circuit and return the solenoid relay switch to neutral position when the amount of braking has been attained and when employed for use on brakes with a suitable expansible fluid feel device directly connected to the brake fluid to resist movements of the operating finger in amounts proportional to the pressure in the brake fluid.

I preferably so design this switch that the movable contact rod only has a single set of contacts so designed that they can only contact one set of contacts at a time and thus positively prevent flows of currents tending to run the motor in opposite directions at the same time. As my improved follow up is controlled by the pressure in the braking fluid, it is apparent that it permits a step by step release of the brakes, as well as a step by step application thereof.

A further feature of my invention is to incorporate as safety factors, a fluid pressure limit safety switch, which may be set to break the circuit at any desired amount to prevent the building up of a dangerous amount of pressure when applying the brakes, and I also preferably employ safety limit switches to shut off the servo-motor when the brake pedal moves too far in either direction.

A further object of my invention is to employ the same parts hitherto described, omitting the feel portion of the switch and the pressure limit safety switch, for a device also attachable to the motor vehicle for engaging and disengaging the clutch; in this instance, however, employing a mechanical follow up actuated in proportion to movements of the clutch pedal rather than a fluid follow up as there is no fluid available for operating a clutch follow up.

Further objects of my invention relate to improvements in the construction of the various parts shown and the manner in which they are connected up to achieve my desirable results.

These and such other objects of my invention as may hereinafter appear will be best understood from a description of an embodiment thereof, such as is shown in the accompanying drawings.

In the drawings, Fig. 1 is a diagrammatic perspective view of center portions of an automobile, broken away to show the operating parts of my invention, namely, my attachment for controlling the brake pedal, my attachment for controlling the clutch pedal and the finger operated attachments for controlling said respective attachments mounted on the gear shift lever of an automobile.

Figs. 2 to 5 are diagrammatic views partially shown in elevation and partially shown in section of the component parts of my invention attached respectively to the gear shift lever and brake pedal for use in applying the brakes, Fig. 2 showing the device in neutral position, Fig. 3 showing the device in brake applying position, Fig. 4 showing the device in brake applied position, and Fig. 5 showing the device in brake releasing position.

Fig. 6 is a diagrammatic view partially shown in elevation and partially shown in section of the component parts of my invention attached respectively to the gear shift lever and the clutch pedal for use in actuating the clutch, also showing the parts in neutral position.

In the drawings, wherein like characters of reference generally indicate like parts throughout, 10 generally indicates a motor driven vehicle having my invention attached. Said automobile has the usual standard parts, such as the wheels 12, steering post 14, steering wheel 16, gear shift lever 18, clutch pedal 20, clutch 21, brake pedal 22, brake cylinder 24, brake cylinder piston 26, brake cylinder piston rod 28, and pipe lines 30 connected to the respective individual fluid motors 32 for applying the respective brakes 33 to the wheels 12. The clutch pedal 20 is connected to the clutch 21 by the tie rod 34 and clutch fork 36 as usual.

In accordance with my invention, I provide motive means 38, such as a supplemental booster or servomotor 38 for actuating the braking means 33 to apply the brakes, in the embodiment shown, through the medium of the usual fluid system 40 including the master cylinder 24, the flexible pipes 30 and the individual brake cylinders 32, said master cylinder 24 having a piston 26 moved by the connecting rod 28 actuated by the foot pedal 22 operatively connected to the motive means 38 to be respectively lowered and raised thereby having a finger operating member 42 movably mounted preferably on the gear shift lever 18 for controlling the braking means motive means 38, motive means 44 for moving the clutch 21 back and forth from operative to inoperative positions and a second finger operative member 46 also movably mounted also preferably on the gear shift lever 18 for controlling the clutch means motive means 44 whereby one hand may actuate the gear shift lever 18 and fingers of said hand operate the respective finger operable members 42 and 46 to operate the braking means 33 and the clutch 21. In my preferred embodiment the motive means for operating both the braking means and clutch means preferably comprises a reversible electric motor 38 or 44.

As stated, in both embodiments, I employ follow up means to shut off the respective motive means after the brakes have been applied and the clutch moved in response to movements of the respective finger operated members 42 and 46. In the embodiment shown, the follow up means 48 for operating the brake motor 38 is preferably fluid controlled and in the embodiment shown is responsive to the pressure of the brake fluid 31 and functions to shut off said motive means 38 after the fluid pressure in the brake fluid 31 has responded to movements of said finger operable member 42 in applying or releasing the brakes. The follow up means 50 for the clutch is preferably mechanically controlled by the clutch means motive means 44 after predetermined movements of said second finger operable member 46. As stated, one important feature of my device is that I provide feel means 52 responsive to the pressure of the fluid 31 in said brake fluid cylinder 24 reduced to a finger resistant amount opposing forward movement of said finger operable member 42. It is obvious, however, that insofar as said features of my invention are concerned that any type of motive means may be employed and where a fluid controlled motive means is employed the feel device may, if desired, be connected to be responsive to the fluid in the motive means rather than to the brake cylinder fluid 31, as shown in my co-pending application for Fluid Control for Motor Vehicles, Serial No. 621,147 filed October 8, 1945. It is also apparent that the finger operable movable control members 42 and 46, while preferably mounted on the gear shift lever 18, may be mounted on any suitable convenient place adjacent the steering wheel or otherwise. The feel means 52 hitherto referred to preferably comprises a cylinder 54 connected by the pipe 56 to the brake fluid pipe 30, or, if the fluid control follow up means 48 be employed, to the pipe 58 connecting the fluid expansible means 60 thereof to said brake pipe 30 and the piston 62. It will be noted that I am enabled to reduce the pressure in the feel means 52 opposing forward movement of said finger operable member 42 to a finger resistant amount by making the diameter or area of the piston 62 many times smaller than the diameter or area of the brake piston 26, or in the embodiment shown in my other application, the main operating piston, in the embodiment shown being at least 40 times smaller in area. In practice the brake cylinder piston 26 has an area of approximately one and one-quarter inches, and I make the diameter of my feel piston 62 approximately three-sixteenths of an inch, making the area thereof approximately about forty-five times smaller than that of the brake cylinder piston 26.

Figures 2 to 5 show the parts of the preferred embodiment of my invention used in applying the brakes and Fig. 6 shows the parts of my invention used in applying the clutch, although with the exceptions to be explained, most parts are identical with the exception that the clutch attachment omits the feel portion of the device and employs a mechanically controlled follow up rather than a fluid controlled follow up. The parts which are similar in the two devices therefor will only be described in connection with the brake embodiment shown in Figs. 2 to 5, and the parts differing will be described in detail.

As stated, Figs. 2 to 5 show the brake applying portion of my invention in various positions, Fig. 2 showing the parts in neutral position, Fig. 3 showing the parts in brake applying position, Fig. 4 showing the parts in brake applied position and Fig. 5 showing the parts in brake releasing position. For actuating either the brakes or clutch, as stated, I provide reversible electric motors 38 and 44 respectively. In both embodiments I employ the vertically movable screw 64 suitably keyed against rotative movement by the key 66 in the casing fitting into the keyway 68 in the screw, said screw having its lower end 70 connected with the brake pedal 22. While said screw 64 may be connected with the brake pedal 22 in any suitable fashion, in my preferred embodiment, I have preferably connected it thereto by means of the connection shown and claimed in my companion application aforesaid in a manner so that the brake pedal 22 may be depressed by the usual operation thereof independently of my attachment. The lower end 70 of said screw 64 is unthreaded and has a collar 74 pinned thereto near the lower end of the threaded portion. I provide a sleeve 76 for slidably receiving therein the unthreaded lower end 70 of said screw 64. Said sleeve has an arm 78 projecting rearwardly therefrom. I provide a plate 80 adapted to underlie the brake pedal 22, or clutch pedal 20 preferably the portion 82 projecting upwardly from the pivot rod thereof having an arm 84 projecting downwardly from the upper end thereof pivotally mounted by the pivot rod 87 on said arm 78 projecting rearwardly from said sleeve 76, and means, such as the clamps 86 comprising U-shaped members overlying the brake lever portion 82 and having the ends 88 passing through suitable holes 90 near the lower end of said plate 80 and clamped thereto by the nuts 92. With this construction, it is obvious that depression of the foot pedal 22 will merely draw the sleeve 76 downwardly away from the collar 74 on the unthreaded lower end 70 of said screw 64, but that when my invention is employed for lowering the brake pedal 22 that downward movement of the screw 64 will force the collar 74 against the upper end of the sleeve and the lower end 70 of the screw against the arm 78 to cause depression of the plate 80 to depress the foot pedal 22.

I also provide gear means actuated by said reversible electric motors 38 or 44 to raise and lower said screw 64. In the preferred embodiment said gear means comprises a gear 94 on the motor shaft 95 meshed with the large gear 96 of the reducing gear 98 mounted on the shaft 100, also having a small gear 102 mounted thereon to mesh with the outer teeth of the internally threaded gear 104 having the internal threads 106 in the hub thereof to mesh with the threads on the screw 64.

The motors 38 or 44 are provided with the field windings 108 and the brushes 110 contacting the commutator 112 of the rotatable armature 114 thereof.

To control operation of the motor, I employ a double throw multiple contact solenoid operated reversing relay switch 116. This relay switch has two spaced lines 118 and 120 of contacts 122 selectively and alternately operably connectable to the field 108 and brushes 110 of the armature 114 of the reversible motor 38 or 44, the right hand row 120 being adapted to actuate its respective electric motor in a forward direction to apply the brakes or release the clutch and the left hand row being adapted to rotate the motor in a reverse direction to release the brakes or apply the clutch. Between said lines of contacts 118 and 120 I provide a laterally movable rod member 124 having cooperatingly spaced aligned contacts 126 movable laterally back and forth into contact with one of the spaced rows of contacts 118 or 120 to complete the circuits to rotate the respective motor in a forward or reverse direction. The lower end of the rod 124 is provided with a base rod 128 at right angles thereto having armatures 130 and 132 on each end thereof adapted to reciprocate in and out of a respective solenoid 134 and 136. Thus when the solenoid 136 is actuated as shown in Fig. 3 the armature 132 and the rod 124 connected thereto is moved to the right to cause its contacts 126 to contact the row of contacts 120 for forward motion of the motor 38 or 44 and as shown in Fig. 5, when the solenoid 134 is energized, the armature 130 is drawn laterally to the left to permit its contacts 126 on rod 124 to contact the row of contacts 118 to rotate the motor 38 in a reverse direction. To return the rod 124 to a neutral position I provide the springs 138 and 140 abutting opposite sides of the rod 124 and against a suitable portion of the casing to return the rod to a mid-neutral position when the solenoids 134 and 136 are both deenergized.

I provide a suitable switch 142 for energizing and deenergizing the respective solenoids 134 and 136. In the embodiment shown, the switch 142 is mounted adjacent the finger operated member 42 and in my preferred embodiment, I provide a small casing 144 detachably securable preferably to the gear shift lever 18, in which portions of the follow up device 48, the operating switch per se 142 and the "feel" means 52 are mounted, thereby providing a combination finger operated fluid follow up, fluid "feel" and operating switch 146.

The casing 144 may be suitably mounted on the gear shift lever 18, preferably as shown by split brackets with the split portions joined together by screws 236, half of which may be on the brake control switch casing and half of which may be on the clutch control switch casing if both are employed together as in my preferred embodiment.

I mount the spaced contacts 148 and 150 having the contact portions 152 projecting inwardly of the casing 144 at a spaced distance from each other, the contact 148 being connected by the line 154 to the solenoid 136 and the contact 150 being connected by the line 156 to the solenoid 134 to rotate the motor 38 in reverse directions in the manner explained on the respective energization thereof in the manner to be explained. I provide the slidable contact plate 158 longitudinally slidably mounted within said casing 144 having the spaced contact portions 160 and 162 separated by the insulated portion 164, the contact portion 160 being effective to operate the contact 148 and the contact portion 162 being effective to operate the contact 150 when suitably grounded in the manner to be explained. In the particular embodiment shown, the entire slidable plate 158 is constructed of metal and has the cavities 168 on each side thereof for each respective contact portion 160 and 162 spaced from each other by the insulated portion 164. A cup 170 of insulating material is inserted within each cavity 168. A contact plate 172 fills the interior of each cup and the contact plates on each respective side of said slidable plate 158 are electrically connected together by means of the rivets 174 forming a connection between the contact plate portions 172 on each side thereof clearly electrically separating each contact portion 160 and 162 from the insulated portion 164. The outer end of the plate 158 is provided with a suitable hole 176 for receiving the inwardly bent end 178 of the finger operative member 42. The shank 180 thereof projects outwardly from said end 178 through a suitable hole 181 in the outer end of the casing 144 and terminates in the finger grip or handle 182. A coil spring 184 surrounds the shank 180 of the member 42 and has an inner end abutting the bent inner end 178 of the shank 180 and an outer end abutting the casing wall. The spring 184 therefore is compressed on outward movements of the member 42 and contact plate 158 to expand to return the handle and contact plate to their innermost neutral position shown in Fig. 2.

In either embodiment, a circuit is completed through the contact portions 160 or 162 through a movable ground contact 186 abutting the interior surface of the contact plate 158. In the brake embodiment shown in Figs. 2 to 5 this ground contact is mounted on the outer end of the fluid expansible means 48 to move relative to the plate 158 on changes in fluid pressure brought about by the application of the brakes. In the clutch embodiment shown in Fig. 6, however, this ground contact is also slidably mounted on a separate plate mechanically controlled by movements of the screw 64 or clutch pedal 20.

In the braking embodiment shown in Figs. 2 to 5 the casing 144 may be provided with a partition 188 forming a follow up compartment 190 separated from the slidable plate compartment 191. Said wall 188 may be provided with a slot 192 for guiding the contact 186 in a straight line over the surface of the contact plate 158 and to ground the contact plate.

The fluid expansible means 60 is mounted in the inner end of its respective compartment 190. While any suitable type of fluid expansible means may be employed, I have shown in the drawings a preferably metallic, bellows device, although, if desired, any other equivalent type of expansible means may be employed. As stated, the contact 186 is rigidly mounted on the outer end of the movable portion of said expansible bellows or means 60. The movable contact 186 is movable from a position abutting either contact portion 160 or 162 to an intermediate portion abutting the insulated portion 164.

In use, the contact plate 158 is moved by the finger member 42 to bring the follow up contact 186 in contact with one of the contact portions 160 or 162 thereof to complete the circuit to actuate the motor in the desired direction. As pressure builds up or reduces in the brake fluid 31, the expansible bellows 60 will expand or contract to move the follow up contact 186 away from its respective contact portion 160 or 162 to opposite the insulated portion 164, breaking the respective electrical circuit and causing the flow of current to cease in the respective wire leading to the respective solenoids 134 or 136. When current no longer flows through a solenoid, the spring 138 or 140 will move the movable rod 124 to its neutral position shown in Fig. 2 shutting off the motor 38 or 44. I also employ adjustable spring means 194 to yieldingly resist the outward movement of the fluid expansible portion 48 abutting the outer end of said portion 48 and the wall of the casing. In my preferred embodiment, an adjusting washer 196 is interposed between the outer end of the spring means 194 and the outer wall of the casing. An adjusting nut 198 projects through the outer wall of the casing to abut said washer 196 on the outer end of the adjusting spring 194 to control the compressibility of the spring, if desired, to adjust the expansibility of the bellows 60 relative to the pressure required in the brake fluid 31.

As also stated, I preferably incorporate in said switch a "feel" device mounted in the outer end of the casing in alignment with the contact plate 158. Said "feel" device 52 comprises a small cylinder 200 with its base rigidly mounted on the outer wall of said casing 144 and the piston 202 comprising a tube having a closed piston end 62, of a size relative to the cylinder 200 to be telescopically slidable therein and suitably sealed, if desired. The connecting pipe 56 is connected to the outer end of the cylinder 200 and is connected in the manner explained to the pipe 58 for connecting the fluid expansible means 60 to a pipe 30 of the braking system. As stated hitherto, the piston end 62 of the piston tube 202 has such a small area compared to that of the brake cylinder piston as to reduce the pressure opposing forward movement of said finger operated member 42 to a finger resistant amount.

For safety purposes, I may employ a pressure limit switch 204 in the pipe 58 leading from the brake pipe 30 to the follow up device 48 and "feel" cylinder 200. Said device includes a piston 206 normally urged by a spring 208 to the top of a cylinder 210 having a piston rod 212 projecting downwardly therefrom, the top of the closed cylinder 210 being suitably connected by a pipe 214 to the pipe 58. The piston rod 212 projects through a hole 216 in lower end of said cylinder 210 to abut the movable blade 218 of a switch 220 interposed in the line 154 connecting the advancing contact portion 160 of the switch 142 to the solenoid 136. If too much pressure should develop in the braking system, it is obvious that the spring 208 is so adjusted that excess pressure depresses the piston 206 to cause the piston rod 212 to contact the blade 218 to break the circuit in the line 154.

For safety purposes I also provide the limit switches 222 and 224 in the lines 154 and 156. While any suitable type of limit switches may be employed, I have diagrammatically illustrated a type having two spaced contacts 225 and 226 connected to split ends of the circuit and a movable connecting plate 228 normally electrically connecting said contacts 225 and 226. A rod 230 projects inwardly from said movable plate 228 towards the screw 64. The upper end of the screw is provided with a knob or projection 232 adapted to contact said rod 230 to force the plate 208 away from its respective contacts 224 and 226 to break its respective circuit. One switch 222 is interposed in the line 156 to shut off the motor when it tends to return the brake pedal 22 to a too high position and a similar switch 224 is installed in the line 154 when the motor tends to apply the brakes too much or move the pedal 22 to a too low position as the screw 64 moves downwardly.

The embodiment shown in Fig. 6 for actuating the clutch is essentially similar to that shown in Figs. 2 to 5 for actuating the brakes. In this instance, however, the "feel" device is omitted and I provide a supplemental plate 238 slidable in the casing 144 having the follow up contact 186 mounted thereon. A pressure spring 240 may be provided to abut the wall of the casing 144 to keep the follow up contact 186 at all times in contact with the contact plate 158. A return spring 242 is interposed between the outer end of the movable plate 238 and the outer wall of the casing. I also mount adjacent the screw 64 an actuating gear 244. I provide flexible means 246 having an axially movable portion 254 having one end thereof connected to a point 248 on said actuating gear spaced from the center thereof and the opposite end thereof connected to the inner end 250 of the slidable plate 238. While any suitable type of flexible means having an axially movable portion 254 may be employed, I preferably employ a Bowden wire 254 having an outer flexible casing 252 and the axially movable wire 254 as the movable portion thereof within said casing 252 having its ends respectively connected to the points 248 and 250. I also interpose a reducing gear 256 between the screw 64 and the actuating gear 244 having a small gear portion 258 meshing with the actuating gear 244 and a large gear portion 260 meshing with the screw 64. It is thus obvious that movements of the motor 44 in operating the clutch will be transmitted to the follow up contact 186 to shut off the motor corresponding to movements of finger operated member 46. It is obvious, however, that any other suitable type of follow up device may be employed as a follow up for the clutch.

As stated, Figs. 2 to 5 illustrate the operation of the both portions of my device. Fig. 2 shows the device in neutral position. Fig. 3 illustrates the device as it is moved into braking position with the finger operated member 42 pulled radially outwardly on the gear shift lever 18. It will be noted that the fixed contact 148 contacts the inner contact portion 160 and that the follow up contact 186 is also opposite the inner contact portion 160. This energizes the circuit 154 and its respective solenoid 136 to pull the switch rod 124 to the right to a position bringing its contacts 126 into contact with the contacts 122 of the line 120 so connected to the motor 38 or 44 as to cause it to rotate in a forward direction to move the screw 64 downwards to move the foot or clutch pedal downwards to move the brake cylinder piston 26 into the position shown to start to apply the brakes. In Fig. 3, the wires through which the circuit is then flowing are shown in heavier lines than the lines through which current does not flow. Fig. 4 shows the device after outward movement of the finger operative member 42 has ceased and the fluid expansible bellows 60 of the hydraulic follow up device 48 has been expanded by increased pressure in the brake fluid 31 to move the follow up contact 186 opposite the insulated position 164, breaking the current in circuit 154 deenergizing the solenoid 136 to permit the spring 138 to return the movable contact rod 124 to its mid neutral position shutting off the motor 38 or 44. The parts will remain in this position with the brakes applied the desired amount until the finger operated member 42 is again moved in a forward or reverse direction.

Fig. 5 illustrates the brake releasing position of the device. The finger is released entirely from the finger operated member 42 permitting the spring 184 to move the contact plate to its innermost position or partially released. This will bring the ground contact 186 into position opposite the outer contact plate 162 causing a circuit to flow through the line 156 to energize the solenoid 134 to move the contact rod 124 to bring its respective contacts 126 into abutment with the contacts 122 of the line of contacts 118 for reverse rotation of the motor 38 or 44 permitting the screw 64 to rise upwardly returning the brake pedal 22 to neutral position and retracting the piston 26 in the brake cylinder 24 thereby releasing pressure on the brake fluid or releasing the clutch. As pressure is released on the brake fluid the fluid expansible means 48 will eventually contract to again bring the follow up contact 186 into abutment with the insulated portion 164 of the contact plate 158 thereby shutting off current in the circuit 156 causing deenergization of the solenoid 134 and permitting the return spring 138 to bring the movable contact rod 124 to its mid neutral position thereby shutting off the motor 38, the parts again assuming the neutral position shown in Fig. 2.

It is apparent that I have provided a hand control for motor vehicles which may be readily operated by a finger of a leg cripple with the other features explained above.

It is understood that my invention is not limited to the specific embodiments shown and that various deviations thereof may be made therefrom without departing from the spirit and scope of the appended claims.

What I claim is:

1. In a control system for a motor driven vehicle for use by a leg cripple, wheel braking means, clutch means for operatively connecting the power to the wheels, motive means for actuating the braking means to apply the brakes, motive means for moving the clutch means back and forth from operative to inoperative positions, a gear shift lever, a finger operable member movably mounted on the gear shift lever for controlling the braking means motive means and a second finger operable member also movably mounted on the gear shift lever for controlling the clutch means motive means whereby one hand may actuate the gear shift lever and fingers of said hand operate the braking means and clutch means.

2. In a control system for a motor driven vehicle having braking means, for use by a leg cripple, a gear shift lever, a fluid system for applying the braking means including an operating cylinder and a piston movable in said cylinder to compress and move the fluid to apply the brakes; reversible electric motive means to advance and retract the piston, a finger operable member movably mounted on the gear shift lever for actuating said motive means in opposite directions, fluid controlled follow up means responsive to the pressure in said brake fluid for shutting off said motive means after the fluid pressure has responded to movements of said finger operable member, feel means responsive to the pressure of the fluid in said brake fluid cylinder reduced to a finger resistant amount opposing forward movement of said finger operable member, clutch means for operatively connecting the power to the wheels, electric motive means for moving the clutch means back and forth from operative to inoperative positions, a second finger operable member also movably mounted on the gear shift lever for actuating the clutch means motive means and follow up means controlled by said clutch means motive means for shutting off said motive means after predetermined movements of said second finger operable member whereby one hand may actuate the gear shift lever and fingers of said hand may operate the braking means and clutch means.

3. In a control system for a motor driven vehicle having braking means, for use by a leg cripple, a fluid system for applying the braking means including reversible motive means, a finger operable movably mounted member for actuating said motive means in opposite directions, follow up means responsive to the pressure in said fluid system for shutting off said motive means after the fluid pressure has responded to movements of said finger operable member, feel means responsive to the pressure in said fluid system reduced to a finger resistant amount opposing movement of said finger operable member, clutch means for operatively connecting the power to the wheels, motive means for moving the clutch means back and forth from operative and inoperative positions, a second finger operable member also movably mounted for actuating the clutch means motive means and follow up means controlled by said clutch means motive means for shutting off said motive means after predetermined movements of said second finger operable member.

4. In a control system for a motor driven vehicle having braking means, for use by a leg cripple, a fluid system for applying the braking means, including an operating cylinder and a piston movable in said cylinder to compress and move the fluid to apply the brakes, reversible electric motive means to advance and retract the piston, a finger operable movably mounted member for actuating said motive means in opposite directions, fluid controlled follow up means responsive to the pressure in said brake fluid for shutting off said motive means after the fluid pressure has responded to movements of said finger operable member, feel means responsive to the pressure in said brake fluid reduced to a finger resistant amount opposing forward movement of said finger operable member, clutch means for operatively connecting the power to the wheels, electric motive means for moving the clutch means back and forth from operative and inoperative positions, a second finger operable member also movably mounted for actuating the clutch means motive means and follow up means controlled by said clutch means motive means for shutting off said motive means after predetermined movements of said second finger operable member.

5. In a control system for a motor driven vehicle having braking means, for use by a leg cripple, a gear shift lever, a fluid system for applying the braking means including an operating cylinder and a piston movable in said cylinder to compress and move the fluid to apply the brakes, reversible motive means to advance and retract the piston, a finger operable member movably mounted on the gear shift lever for actuating said motive means in opposite directions, follow up means responsive to the pressure in said brake fluid for shutting off said motive means after the fluid pressure has responded to movements of said finger operable member, feel means responsive to the pressure in said brake fluid, reduced to a finger resistant amount opposing forward movement of said finger operable member, clutch means for operatively connecting the power to the wheels, motive means for moving the clutch means back and forth from operative and inoperative positions, a second finger operable member also movably mounted on the gear shift lever for actuating the clutch means motive means and follow up means controlled by said clutch means motive means for shutting off said motive means after predetermined movements of said second finger operable member whereby one hand may actuate the gear shift lever and fingers of one hand may operate the braking means and clutch means.

6. In a control system for a motor driven vehicle having braking means, for use by a leg cripple, a gear shift lever, a fluid system for applying the braking means including an operating cylinder and a piston movable in said cylinder to compress and move the fluid to apply the brakes, reversible electric motive means to advance and retract the piston, a finger operable member movably mounted on the gear shift lever for actuating said motive means in opposite directions, fluid controlled follow up means responsive to the pressure in said brake fluid for shutting off said motive means after the fluid pressure has responded to movements of said finger operable member, feel means responsive to the pressure of the fluid in said brake fluid cylinder including a piston having an area at least forty times smaller than that of said brake cylinder piston to reduce the pressure opposing forward movement of said finger operable member to a finger resistant amount, clutch means for operatively connecting the power to the wheels, electric motive means for moving the clutch means back and forth from operative and inoperative positions, a second finger operable member also movably mounted on the gear shift lever for actuating the clutch means motive means and follow up means controlled by said clutch means motive means for shutting off said motive means after predetermined movements of said second finger operable member whereby one hand may actuate the gear shift lever and fingers of said hand operate the braking means and clutch means.

7. In a control system for a motor driven vehicle having braking means, for use by a leg cripple, a fluid system for applying the braking means including an operating cylinder and a piston movable in said cylinder to compress and move the fluid to apply the brakes, reversible motive means to advance and retract the piston, a finger operable movably mounted member for actuating said motive means in opposite directions, follow up means responsive to the pressure in said fluid system for shutting off said motive means after the fluid pressure has responded to movements of said finger operable member, feel means responsive to the pressure in said fluid system including a piston having an area at least forty times smaller than that of said brake cylinder piston to reduce the pressure opposing forward movement of said finger operable member to a finger resistant amount, clutch means for operatively connecting the power to the wheels, motive means for moving the clutch means back and forth from operative and inoperative positions, a second finger operable member also movably mounted for actuating the clutch means motive means and follow up means controlled by said clutch means motive means for shutting off said motive means after predetermined movements of said second finger operable member, said first finger operable member and said second finger operable member being mounted in spaced parallel relation beneath the steering wheel of the motor vehicle whereby both members may be operated simultaneously with the fingers of one hand.

8. In a braking system for vehicles for use by a leg cripple, a fluid system for applying the brakes including reversible electric means to apply and release the brakes, a finger operable movably mounted member for controlling said motive means, fluid controlled follow up means responsive to the pressure in said fluid system, for shutting off said motive means after the fluid pressure has responded to movements of said member, and feel means responsive to the pressure in said fluid system reduced to a finger resistant amount opposing forward movement of said finger operable member.

9. In a braking system for vehicles for use by a leg cripple, a fluid system for applying the brakes including an operating cylinder, and a piston movable in said cylinder to compress and move the fluid to apply the brakes, reversible electric motive means to advance and retract the piston, a finger operable movably mounted member for controlling said motive means, fluid controlled follow up means responsive to the pressure in said brake fluid for shutting off said motive means after the fluid pressure has responded to movements of said member, and feel means responsive to the pressure of the fluid in said brake fluid cylinder reduced to a finger resistant amount opposing forward movement of said finger operable member.

10. In a control system for a motor driven vehicle having brakes, for use by a leg cripple, having a gear shift lever, a fluid system for applying the brakes including an operating cylinder and a piston movable in said cylinder to compress and move the fluid to apply the brakes, and a brake pedal; a reversible electric motor, a vertically movable screw connected to the brake pedal, gear means actuated by said reversible electric motor to raise and lower said screw to actuate the brake pedal to move said brake cylinder piston to apply or release the brakes, a double throw multiple contact solenoid operated reversing relay switch comprising two spaced lines of contacts connected to the armature and field of said reversible motor, each adapted on energization thereof to rotate the motor in opposite directions, a laterally movable rod member having a cooperating line of contacts movable laterally back and forth against said respective spaced lines of contacts having a base having armatures on the ends thereof and oppositely disposed solenoids adapted to energize a respective armature to move said movable contact member on the respective energization thereof to selectively contact alternate lines of contacts and spring means to return said contact rod to a neutral position and a combination finger operated fluid follow up, feel and operating switch mounted on the gear shift lever comprising a casing, spaced contacts mounted in said casing, lines connecting each contact to a respectively opposite relay switch solenoid, a slidable contact plate having spaced contact portions extending through said plate separated by an insulated portion, each slidable into abutment with a spaced fixed contact, a finger operable portion projecting therefrom to without said casing to move said contact plate in one direction and spring return means to return said contact plate in the opposite direction, a fluid expansible means mounted in said casing having a movable ground contact projecting laterally therefrom movable to abut a contact portion and an insulated portion of said movable contact plate and pipe means connecting said fluid expansible means with the brake cylinder whereby outward and inward movements of said finger operated portion may bring a stationary contact in contact with one contact portion to form a contact through the ground contact to actuate said solenoid switch to move the electric motor to move the brake pedal to apply and release the brakes and the pressure in said brake cylinder may correspondingly expand and contract said fluid expansible means to move its ground contact opposite an insulated portion of said plate to shut off the current when the brake has been applied or released corresponding to movements of the finger operated portion, adjustable spring means yieldingly resisting the outward movement of said fluid expansible means, a feel device comprising a cylinder mounted in said casing, pipe means connecting said cylinder to said brake fluid cylinder and a piston movable within said cylinder having such a small area compared with that of the brake cylinder piston as to reduce the pressure opposing forward movement of said finger operated portion to a finger resistant amount, a pressure limit safety switch in the pipe line connecting said switch and brake fluid cylinder responsive to pressure therein to break the circuit in the switch line for the advancing movement of the motor after pressure has attained a predetermined amount and limit switches in the lines connecting said actuating switch and relay switch actuated by a projection from said screw at the desired limits of travel of said screw to break said respective circuits to shut off said motor.

11. In a control system for a motor driven vehicle having brakes, for use by a leg cripple, having a fluid system for applying the brakes including an operating cylinder and a piston movable in said cylinder to compress and move the fluid to apply the brakes, and a brake pedal; a reversible electric motor, a vertically movable screw connected to the brake pedal, gear means actuated by said reversible electric motor to raise and lower said screw to actuate the brake pedal to move said brake cylinder piston to apply or release the brakes, a double throw multiple contact solenoid operated reversing relay switch comprising two spaced lines of contacts connected to the armature and field of said reversible motor, each adapted on energization thereof to rotate the motor in opposite directions, a laterally movable rod member having a cooperating line of contacts movable laterally back and forth against said respective spaced lines of contacts having a base having armatures on the ends thereof and oppositely disposed solenoids adapted to energize a respective armature to move said movable contact member on the respective energization thereof to selectively contact alternate lines of contacts and spring means to return said contact rod to a neutral position, and a combination finger operated fluid follow up, feel and operating switch comprising a casing, spaced contacts mounted in said casing, lines connecting each contact to a respectively opposite relay switch solenoid, a slidable contact plate having spaced contact portions extending through said plate separated by an insulating portion each slidable into abutment with a spaced fixed contact, a finger operated portion projecting therefrom to without said casing to move said contact plate in one direction and spring return means to return said contact plate in the opposite direction, fluid expansible means mounted in said casing having a movable ground contact projecting laterally therefrom movable to abut a contact portion and an insulated portion of said movable contact plate and pipe means connecting said fluid expansible means with the brake cylinder whereby outward and inward movements of said finger operated portion may bring a stationary contact in contact with one contact portion to form a contact through the ground contact to actuate said solenoid switch to move the electric motor to move the brake pedal to apply and release the brakes and the pressure in said brake cylinder may correspondingly expand and contract said fluid expansible means to move its ground contact opposite an insulated portion of said plate to shut off the current when the brake has been applied or released corresponding to movements of the finger operated portion, adjustable spring means yieldingly resisting the outward movement of said fluid expansible means, a feel device comprising a cylinder mounted in said casing, pipe means connecting said cylinder to said brake fluid cylinder and a piston movable within said cylinder having such a small area compared with that of the brake cylinder piston as to reduce the pressure opposing forward movement of said finger operated portion to a finger resistant amount, and a pressure limit safety switch in the pipe line connecting said switch and brake fluid cylinder responsive to pressure therein to break the circuit in the switch line for the advancing movement of the motor after the pressure has attained a predetermined amount.

12. In a control system for a motor driven vehicle having brakes, for use by a leg cripple, having a fluid system for applying the brakes including an operating cylinder and a piston movable in said cylinder to compress and move the fluid to apply the brakes, and a brake pedal; a reversible electric motor to actuate the brake pedal to move said brake cylinder piston to apply or release the brakes, a double throw multiple contact solenoid operated reversing relay switch and a combination finger operated fluid follow up feel and operating switch comprising a casing, spaced contacts mounted in said casing, lines connecting each contact to a relay switch solenoid, a slidable contact plate having spaced contact portions extending through said plate separated by an insulating portion each slidable into abutment with a spaced fixed contact, a finger operated portion projecting therefrom to without said casing to move said contact plate in one direction and spring return means to return said contact plate in the opposite direction, fluid expansible means mounted in said casing having a movable ground contact projecting laterally therefrom movable to abut a contact portion and an insulated portion of said movable contact plate and pipe means connecting said fluid expansible means with the brake cylinder whereby outward and inward movements of said finger operated portion may bring a stationary contact in contact with one contact portion to form a contact through the ground contact to actuate said solenoid switch to move the electric motor to move the brake pedal to apply and release the brakes and the pressure on said brake cylinder may correspondingly expand and contract said fluid expansible means to move its ground contact opposite an insulated portion of said plate to shut off the current when the brake has been applied or released corresponding to movements of the finger operated portion, adjustable spring means yieldingly resisting the outward movement of said fluid expansible means, a feel device comprising a cylinder mounted in said casing, pipe means connecting said cylinder to said brake fluid cylinder and a piston movable within said cylinder having such a small area compared with that of the brake cylinder piston as to reduce the pressure opposing forward movement of said finger operated portion to a finger resistant amount.

13. In a control system for a motor driven vehicle for use by a leg cripple, having a pedal; a reversible electric motor, to actuate the pedal, a double throw multiple contact solenoid operated reversing relay switch and a combination finger operated follow up and operating switch comprising a casing, spaced contacts mounted in said casing, lines connecting each contact to a relay switch solenoid, a slidable contact plate having spaced contact portions extending through said plate separated by an insulating portion, each slidable into abutment with a spaced fixed contact, a finger operated portion projecting therefrom to without said casing to move said contact plate in one direction and spring return means to return said contact plate in the opposite direction, a movable ground contact, and movable follow up means controlled by said motor carrying said movable ground contact whereby outward and inward movements of said finger operated portion may bring a stationary contact in contact with one contact portion to form a contact through the ground contact to actuate said solenoid switch to move the electric motor to move the pedal, and movement of said follow up means may move its ground contact opposite an insulated portion of said plate to shut off the circuit when the pedal has been moved corresponding to movements of the finger operated portion.

14. In a control system for motor driven vehicles, for use by a leg cripple, having a gear shift lever and a pedal; a reversible electric motor, to actuate the pedal, a double throw multiple contact solenoid operated reversing relay switch and a combination finger operated follow up and operating switch mounted on the gear shift lever comprising a casing, spaced contacts mounted in said casing, lines connecting each contact to a relay switch solenoid, a slidable contact plate having spaced contact portions extending through said plate separated by an insulating portion each slidable into abutment with a spaced fixed contact, a finger operated portion projecting therefrom to without said casing to move said contact plate in one direction and spring return means to return said contact plate in the opposite direction, a movable ground contact, and movable follow up means controlled by said motor carrying said movable ground contact, whereby outward and inward movements of said finger operated portion may bring a stationary contact in contact with one contact portion to form a contact through the ground contact to actuate said solenoid switch to move the electric motor to move the pedal, and movement of said follow up means may move its ground contact opposite an insulated portion of said plate to shut off the circuit when the pedal has been moved corresponding to movements of the finger operated portion.

15. In a control system for a motor driven vehicle for use by a leg cripple, having a gear shift lever, and a pedal; a reversible electric motor, a vertically movable screw connected to the pedal, gear means actuated by said reversible electric motor to raise and lower said screw to actuate the pedal, a double throw multiple contact solenoid operated reversing relay switch comprising two spaced lines of contacts connected to the armature and field of said reversible motor each adapted on energization thereof to rotate the motor in opposite directions, a laterally movable rod member having a cooperating line of contacts movably laterally back and forth against said respective spaced lines of contacts having a base having armatures on the ends thereof and oppositely disposed solenoids adapted to energize a respective armature to move said movable contact member on the respective energization thereof to selectively contact alternate lines of contacts, and spring means to return said contact rod to a neutral position, and a combination finger operated follow up and operating switch mounted on the gear shift lever comprising a casing, spaced contacts mounted in said casing, lines connecting each contact to a respectively opposite relay switch solenoid, a slidable contact plate having spaced contact portions extending through said plate separated by an insulating portion each slidable into abutment with a spaced fixed contact, a finger operated portion projecting therefrom to without said casing to move said contact plate in one direction and spring return means to return said contact plate in the opposite direction, a follow up contact movable parallel to and over said contact plate from a contact portion to an insulated portion, an actuating gear, flexible means having one end connected to said actuating gear and the opposite end connected to said switch follow up contact, a reducing gear meshing with said connecting gear and vertically movable screw and spring means yieldingly resisting forward movement of said follow up contact whereby outward and inward movements of said finger actuated portion may bring a stationary contact in contact with one contact portion to form a contact through the ground contact to actuate said solenoid switch to move the electric motor to move the pedal, and movement of said screw may move the ground contact opposite an insulated portion of said plate to shut off the current when the pedal has moved correspondingly to movements of the finger operated portion.

16. In a control system for a motor driven vehicle for use by a leg cripple, having a pedal; a reversible electric motor, a vertically movable screw connected to the pedal, gear means actuated by said reversible electric motor to raise and lower said screw to actuate the pedal, a double throw multiple contact solenoid operated reversing relay switch and a combination finger operated follow up and operating switch comprising a casing, spaced contacts mounted in said casing, lines connecting each contact to a respectively opposite relay switch solenoid, a slidable contact plate having spaced contact portions extending through said plate separated by an insulating portion each slidable into abutment with a spaced fixed contact, a finger operated portion projecting therefrom to without said casing to move said contact plate in one direction and spring return means to return said contact plate in the opposite direction, a follow up contact movable parallel to and over said contact plate from a contact portion to an insulated portion, an actuating gear, flexible means having one end connected to said actuating gear and the opposite end connected to said switch follow up contact, a reducing gear meshing with said connecting gear and vertically movable screw and spring means yieldingly resisting forward movement of said follow up contact whereby outward and inward movements of said finger may bring a stationary contact in contact with one contact plate to form a contact through the ground contact to actuate said solenoid switch to move the electric motor to move the pedal, and movement of said screw may move the ground contact opposite an insulated portion of said plate to shut off the current when the pedal has moved corresponding to movements of the finger operated portion.

17. In a control system for a motor driven vehicle, for use by a leg cripple having a pedal; a reversible electric motor to actuate the pedal, a double throw multiple contact solenoid operated reversing relay switch comprising two spaced lines of contacts connected to the armature and field of said reversible motor each adapted on energization thereof to rotate the motor in opposite directions, a laterally movable rod member having a cooperating line of contacts movably laterally back and forth against said respective spaced lines of contacts having a base having armatures on the ends thereof and oppositely disposed solenoids adapted to energize a respective armature to move said movable contact member on the respective energization thereof to selectively contact alternate lines of contacts and spring means to return said contact rod to a neutral position and switch means to selectively operate each solenoid to reverse the direction of the motor electrically connected to opposite solenoids and follow up means responsive to movements of said pedal for breaking said circuit to release said relay switch.

JOSEPH A. N. DUBREUIL.

REFERENCES CITED

The following references are of record in the file of this patent:

UNITED STATES PATENTS

| Number | Name | Date |
|---|---|---|
| 1,104,586 | Wadsworth | July 21, 1914 |
| 1,901,371 | Lange | Mar. 14, 1933 |
| 1,921,590 | Staude | Aug. 8, 1933 |

(Other references on following page)

UNITED STATES PATENTS

| Number | Name | Date |
|---|---|---|
| 1,928,143 | Vasselli | Sept. 26, 1933 |
| 1,928,566 | Leupold | Sept. 26, 1933 |
| 1,962,857 | Cash | June 12, 1934 |
| 1,964,693 | Hill | June 26, 1934 |
| 1,976,429 | Backlund et al. | Oct. 9, 1934 |
| 2,011,334 | Folberth et al. | Aug. 13, 1935 |
| 2,015,449 | Folberth et al. | Sept. 24, 1935 |
| 2,026,220 | Denker | Dec. 31, 1935 |
| 2,069,578 | Eaton | Feb. 2, 1937 |
| 2,082,430 | Townsend | June 1, 1937 |
| 2,133,275 | Andres et al. | Oct. 18, 1938 |
| 2,212,920 | Kerr | Aug. 27, 1940 |
| 2,218,723 | Ross | Oct. 22, 1940 |